United States Patent [19]

Takahashi et al.

[11] Patent Number: 5,839,033
[45] Date of Patent: Nov. 17, 1998

[54] APPARATUS HAVING FUNCTION OF SETTING BINDING MARGIN, AND METHOD USED BY THE APPARATUS

[75] Inventors: Toshiharu Takahashi, Kawasaki; Masako Shibaki, Yokohama; Miki Konno, Kawasaki, all of Japan

[73] Assignee: Kabushiki Kaisha Toshiba, Kawasaki, Japan

[21] Appl. No.: 703,353

[22] Filed: Aug. 26, 1996

[30] Foreign Application Priority Data

Aug. 31, 1995 [JP] Japan ..................... 7-246982

[51] Int. Cl.⁶ ..................... G03G 15/04
[52] U.S. Cl. ..................... 399/187; 399/197
[58] Field of Search ..................... 399/187, 193, 399/196, 197

[56] References Cited

U.S. PATENT DOCUMENTS

| | | | |
|---|---|---|---|
| 4,634,266 | 1/1987 | Migita et al. | 399/196 X |
| 4,657,380 | 4/1987 | Hamano et al. | 399/197 X |
| 4,819,029 | 4/1989 | Ito | 399/196 X |
| 4,839,699 | 6/1989 | Hosaka et al. | 399/196 X |
| 4,845,526 | 7/1989 | Iso | 399/196 X |
| 4,941,017 | 7/1990 | Mishima et al. | 399/197 X |

FOREIGN PATENT DOCUMENTS

| | | |
|---|---|---|
| 0 440 272 | 8/1991 | European Pat. Off. . |
| 478 354 A1 | 4/1992 | European Pat. Off. . |
| 0 489 173 | 6/1992 | European Pat. Off. . |
| 0 511 607 | 11/1992 | European Pat. Off. . |
| 7-111582 | 4/1995 | Japan . |

*Primary Examiner*—Fred L. Braun
*Attorney, Agent, or Firm*—Foley & Lardner

[57] ABSTRACT

An image forming apparatus and method for setting a binding margin. When a binding margin displayed on an LCD display unit of an operation panel has been set, a main CPU calculates a position, at which writing of the image of an original document starts, and magnification (an enlargement ratio or a reduction ratio) in accordance with a program stored in a ROM and to correspond to the binding margin and the size of sheets which are set by the LCD display unit and the size of the original document read by a scanner, and causes a printer to perform printing in accordance with a result of the calculation. When a binding margin has been set, the image of an original document can accurately be printed without loss of the image of an end portion of the image of the original document while maintaining the specified binding margin.

10 Claims, 14 Drawing Sheets

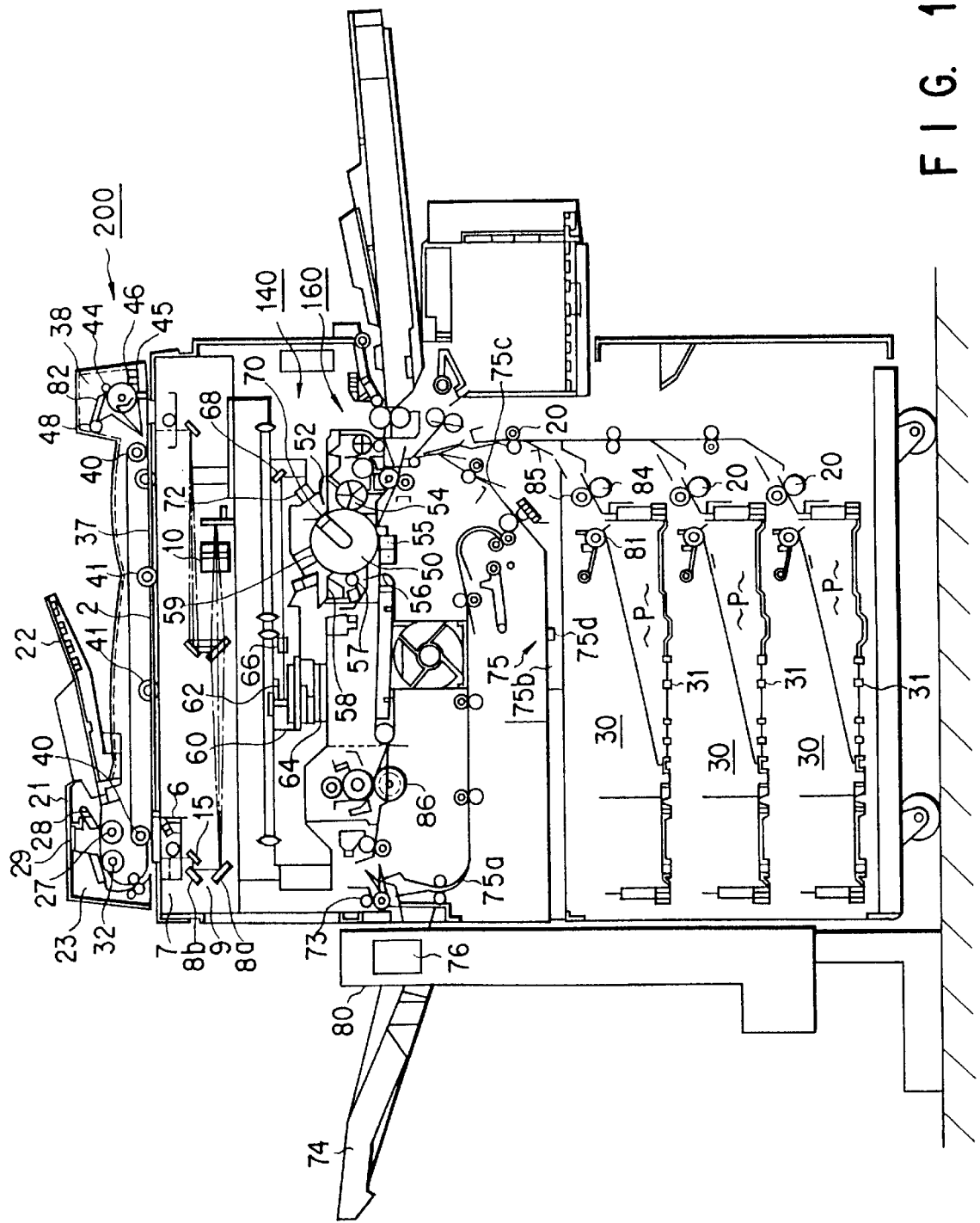
F I G. 1

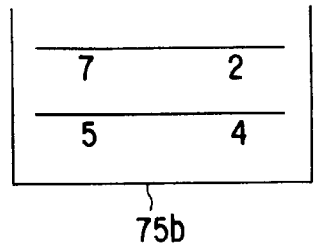
F I G. 8A
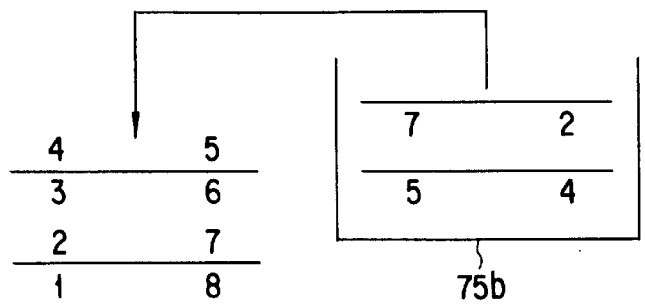
F I G. 8B
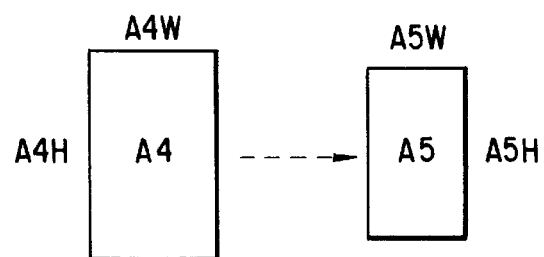
F I G. 8C
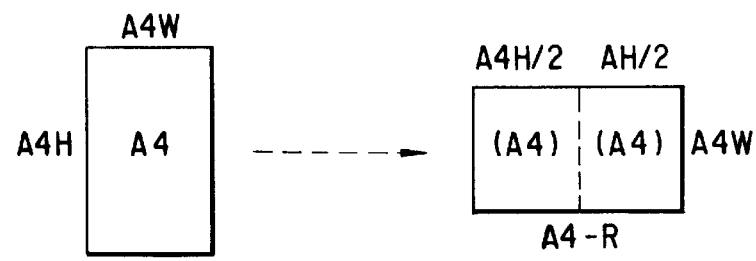
F I G. 9
A4W : WIDTH OF A4-SIZE SHEET
A5W : WIDTH OF A5-SIZE SHEET
A4H : LENGTH OF A4-SIZE SHEET
A5H : LENGTH OF A5-SIZE SHEET
F I G. 10

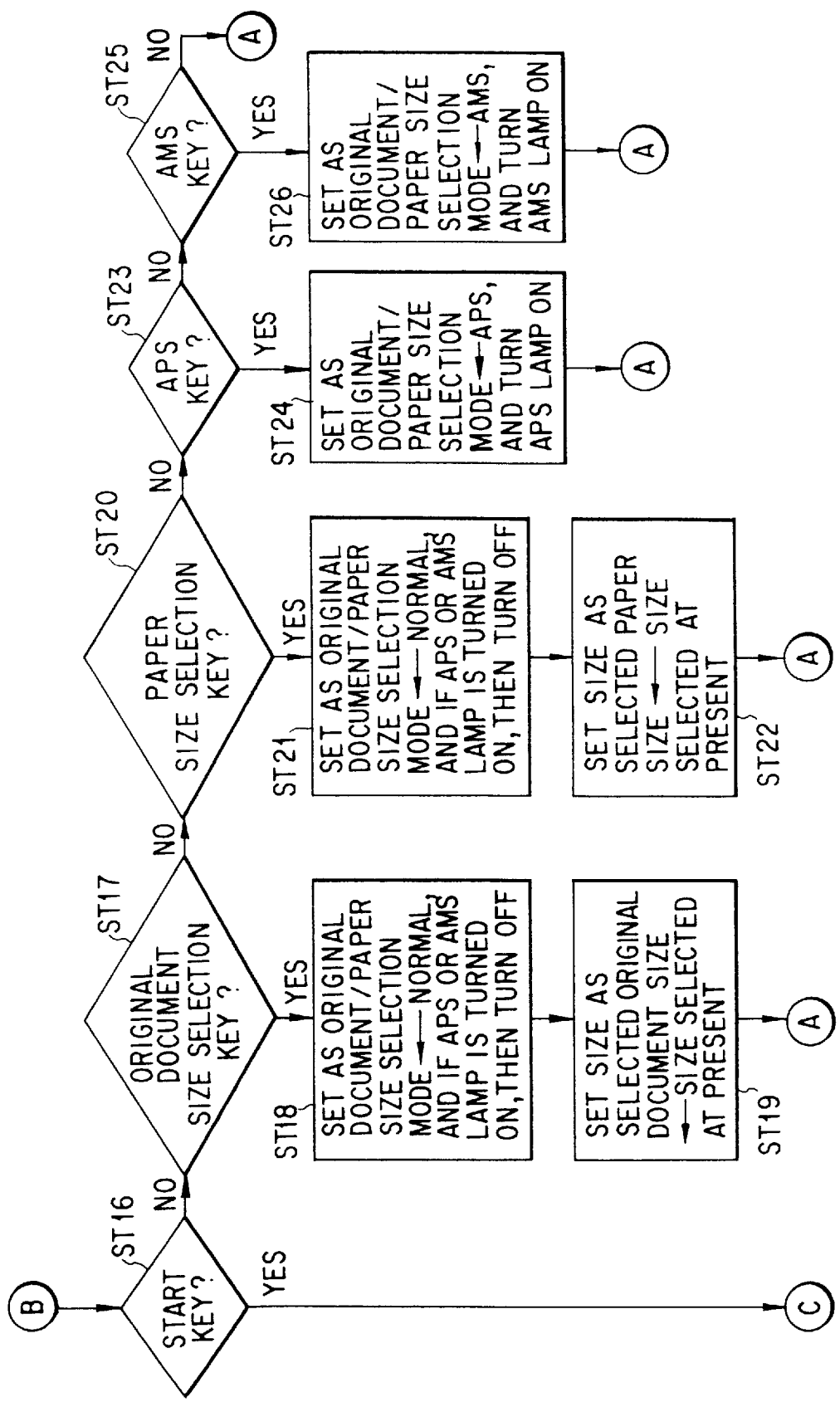
F I G. 18

APPARATUS HAVING FUNCTION OF SETTING BINDING MARGIN, AND METHOD USED BY THE APPARATUS

BACKGROUND OF THE INVENTION

1. Field of the Invention

The present invention relates to an image forming apparatus, such as a digital copying machine, having image compressing means, image expansion means and image storage means, and to an image forming method.

2. Description of the Related Art

Hitherto, a digital copying machine, serving as the image forming apparatus, has been provided with a so-called memory edition and copying function capable of combining a plurality of original-document images with one another to form an image for one sheet so as to print (form) the image. Moreover, the copying machine of the foregoing type has been provided with an electronic sorting and copying function for compressing images read by a scanner and supplied from the same to store the compressed image data items for a plurality of pages in a page memory sectioned for each page and then expanding and printing image data to print each copy.

When a printing operation of the foregoing type is performed, the original document image, to be printed, can be shifted to specify white portion, that is, a binding margin on the sheet. The binding margin may be provided for either of the right-hand portion or the left-hand portion of the copy paper. As an alternative to this, "intermediate binding margin" may be provided with which the binding margin is provided in the central portion of the paper.

However, since the original document image is shifted with respect to the paper when the binding margin has been specified, the end portion of the original document image is sometimes lacked to an extent corresponding to the shift of the original document image.

SUMMARY OF THE INVENTION

An object of the present invention is to provide an image forming apparatus capable of printing an accurate original document image without lack of end portion of the original document image while maintaining a binding margin which has been specified by an operator.

In order to achieve the above object, according to one aspect of the present invention, there is provided an image forming apparatus comprising: means for setting image forming conditions including the amounts of margins which are formed in end regions of image forming mediums when images are, on the image forming mediums, formed from image information; means for inputting information of the size of an original document and the size of the image forming medium; original document; means for, in accordance with image information read by the reading means, forming the images on the image forming mediums having the size input by the input means; means for calculating a magnification with which image information read by the reading means permitting to be formed in a region of the image forming medium except the set margin portion in accordance with the amounts of margins, the size information of the image forming medium and the size information of the original document when the amounts of margins have been set by setting means; and means for converting image information read by the reading means in accordance with a result of calculation performed by the calculating means to cause the image forming means to form the images on the image forming mediums.

According to the present invention, when a binding margin has been set by an operator, the image of an original document can accurately be printed without lack of the image of an end portion of the image of the original document while maintaining the specified binding margin.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a cross sectional view of an image forming apparatus according to an embodiment of the present invention;

FIGS. 8A to 8C are diagrams showing a printing operation to be performed by an automatic two-side unit;

FIG. 9 is a diagram showing an example of an operation for copying an A4-size original document to A5-size sheets;

FIG. 10 is a diagram showing an example of an operation for copying an A4-size original document to A4R-size (horizontal direction) sheets in an intermediate binding mode;

FIG. 18 is a flow chart of operations for reading an original document and storing and printing images of the original document;

DETAILED DESCRIPTION OF THE PREFERRED EMBODIMENTS

Figure 2:
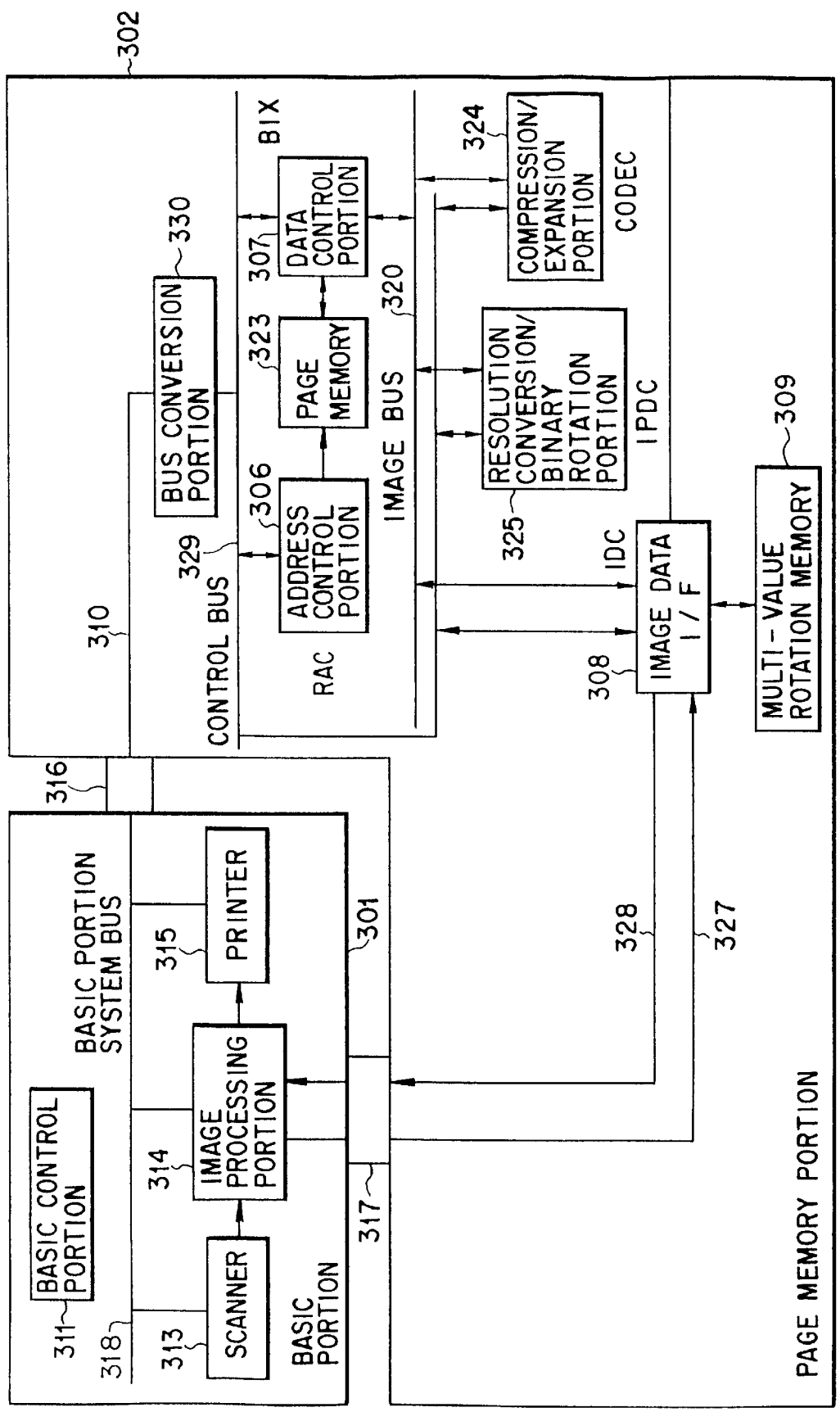
FIG. 2 is a block diagram showing the system of the image forming apparatus.

A preferred embodiment of the present invention will now be described with reference to the drawings.

FIG. 1 is a schematic diagram showing the overall structure of an electronic copying machine which is an image forming apparatus according to the present invention. The apparatus has an original-document scanning portion 140 and an image forming portion 160. An automatic original-document supply unit 200 is mounted on an upper portion of the electronic copying machine.

The automatic original-document supply unit 200 has a cover body 21 serving as the frame and having a rear end which is fastened to the rear end of the upper portion of the body of the apparatus by a hinge unit (not shown) so that the cover body 21 can be opened and closed as required. Thus, the overall body of the automatic original-document supply unit 200 can be rotated and displaced to open the upper portion of an original-document retainer 2. An original-document supply frame 22 capable of collectively holding a plurality of original-document sheets is disposed at a somewhat leftward position of the upper surface of the cover body 21. A supply means 23 for, one by one, extracting the plural original-document sheets to supply the sheets to an end (the left end of FIG. 1) of the original-document retainer 2 is disposed at an end of the apparatus. The supply means 23 has pickup rollers 27 for extracting the original document, a weight plate 28 for pressing the original document against the pickup rollers 27 and an empty sensor 29 serving as an original-document detection sensor for detecting a state where the original document is set to the original-document supply frame 22. In a direction in which the pickup rollers 27 extract the original document, sheet supply rollers 32 are disposed so that the original document sheets are sequentially supplied. An original-document conveying belt 37 covering the upper surface of the original-document retainer 2 is arranged on the upper surface of the original-document retainer 2. The original-document conveying belt 37 comprises a wide endless belt arranged between a pair of belt rollers 40 and having a white outer surface, the original-document conveying belt 37 being moved forwards or rearwards by a belt drive mechanism (not shown). On the reverse side of the inside portion of the original-document conveying belt 37, there are disposed a plurality of belt holding rollers 41 for pressing the surface of the original-document conveying belt 37 against the original-document retainer 2 and a set switch (not shown) for detecting a state where the automatic original-document supply unit 200 is opened or closed. The original document supplied by the supply means 23 is conveyed from an end (the left end) of the original-document retainer 2 to another end (the right end) of the same. A sheet-discharge means 38 is disposed in the right-hand portion of the apparatus. The sheet-discharge means 38 has conveying rollers 44, pinch rollers 45 for pressing the original document against the conveying rollers 44, a sheet discharge sensor 46 serving as an original-document detection means for detecting the rear end of the original document which is moved in a direction in which the original document is discharged. Sheet discharge rollers 48 are disposed downstream from the passage for discharging the original document. The original document discharge passage has a gate 82 for introducing the original document into the original-document retainer 2 while reversing the original document. As a result, images can be copied onto the two sides of the original document.

The original-document scanning portion 140 consists of an exposure lamp 6 serving as a light source; a first carriage 7 having a mirror 15; a second carriage 9 having mirrors 8a and 8b for warping the optical path; a lens 10; a photoelectric conversion portion 11 for receiving reflected light; a drive system (not shown) for changing the positions of the foregoing elements; and an A/D conversion portion (not shown) for converting an output from the photoelectric conversion portion 11, that is, image data from analog data to digital data. The first and second carriages 7 and 9 are connected to each other by a timing belt (not shown) and arranged in such a manner that the second carriage 9 is moved in the same direction as that of the movement of the first carriage 7 at a speed which is the half of that of the first carriage 7. As a result, scanning can be performed in such a manner that the length of the optical path to the lens 10 is made to be constant. The lens 10 has a fixed focal length and arranged to be moved in the direction of the optical axis when the magnification is changed. The photoelectric conversion portion 11 photoelectrically convert light reflected by the original document, the photoelectric conversion portion 11 being mainly composed of, for example, a CCD line image sensor. In this case, one pixel of the original document corresponds to one element of the CCD sensor. An output from the photoelectric conversion portion 11 is transmitted to the A/D conversion portion. The movement of each of the first and second carriages 7 and 9 and the mirrors 8a and 8b is performed by a stepping motor (not shown). The first and second carriages 7 and 9 are moved in accordance with the operation of a timing belt (not shown) arranged between a drive pulley (not shown) connected to a rotational shaft of the stepping motor and an idle pulley (not shown). The lens 10 is moved in the direction of the optical axis due to spiral operation of a spiral shaft (not shown) rotated by a corresponding stepping motor (not shown).

Reference numeral 60 represents an electrooptic conversion portion (a semiconductor laser unit). A collimator lens 62, a polygonal mirror (polyhedron reflecting mirror) 64, a lens 66, reflecting mirrors 68 and 70 and a lens 72 are disposed to correspond to the electrooptic conversion portion 60. Thus, a photo-sensitive drum 50 is irradiated with a laser beam transmitted from an exposure unit 52.

The image forming portion 160 is formed by combining, for example, a laser optical system and an electrophotographic method capable of forming an image on transfer paper. That is, the image forming portion 160 has the photosensitive drum 50 serving as an image carrier rotatively supported at substantially the central portion of the apparatus. The exposure unit 52, a development unit 54, a transference charger 55, a separation charger 56, a cleaning charger 57, a destaticizing charger 58 and a charger 59 are disposed in this sequential order around the photosensitive drum 50. The photosensitive drum 50 is uniformly charged by the charger 59. Moreover, a laser beam emitted from the original-document scanning portion 140 causes the image of the original document to be formed on the photosensitive drum 50 so that an electrostatic latent image is formed.

The electrostatic latent image formed on the photosensitive drum 50 is developed by the development unit 54. The developed image is transferred to copying paper P supplied, by the transference charger 55, from a sheet supply cassette 30 serving as a paper supply means to be described later through the resist controllers 20. The copy paper P having the image transferred by the transference charger 55 is separated by the separation charger 56 due to AC corona discharge, and then conveyed to a fixing unit 86 by the conveyance belt. The copy paper P having the developed image, which has been melted and fixed by the fixing unit 86, is discharged onto a discharge tray 74 through a sorter 80 by a pair of discharge rollers 73. The sorter 80 has a stapler 76 for stapling each set of copied sheets in a staple sorting mode.

Developer retained on the photosensitive drum 50, from which the developed image has been transferred and separated to the copy paper P, is cleaned by the cleaning charger 57. Then, the destaticizing charger 58 makes the potential of the surface of the photosensitive drum 50 to be lower than a predetermined level to enable a next copying operation to be performed.

When the double side copying operation for printing images on the two sides of the copy paper P is performed, the copy paper P having the developed image, which has been melted and fixed by the fixing unit 86, is conveyed through a conveyance passage 75a, and then stacked on a tray 75b. The copy paper P, each having one side on which the image has been printed, is conveyed to the transference charger 55 through a conveyance passage 75c so that developed images are transferred to the residual sides, on which no image has been printed. A light-reflecting type paper sensor 75d is disposed in the lower portion of the tray 75b to detect whether or not paper sheets have been stacked on the tray 75b.

The conveyance passage 75a, the tray 75b, the conveyance passage 75c and the paper sensor 75d form an automatic double side device (ADD) 75 serving as an automatic double side reversing mechanism.

Reference numeral 30 represents each of a plurality of sheet supply cassettes mounted vertically and serving as a sheet supply means mounted detachably from the front portion of an apparatus body 1. The sheet supply cassette 30 is in the form of a cassette case 31 which is a box accommodating the copy paper P. An extraction end of the cassette case 31 is inclined with respect to a direction in which the copy paper P is extracted. The copy paper P accommodated in the cassette case 31 of the sheet supply cassette 30 is, by pickup rollers 81, picked up and extracted in the downward direction such that the uppermost sheet is picked up first. The copy paper P, extracted by the pickup rollers 81 and conveyed to the extraction end of the cassette case 31, is separated one by one in a sheet separation portion consisting of sheet supply rollers 84 and separation rollers (or a separation pad) 85 disposed on the inside portion of an upper portion of the cassette case 31 so as to be conveyed to the image forming portion 160.

Figure 3:
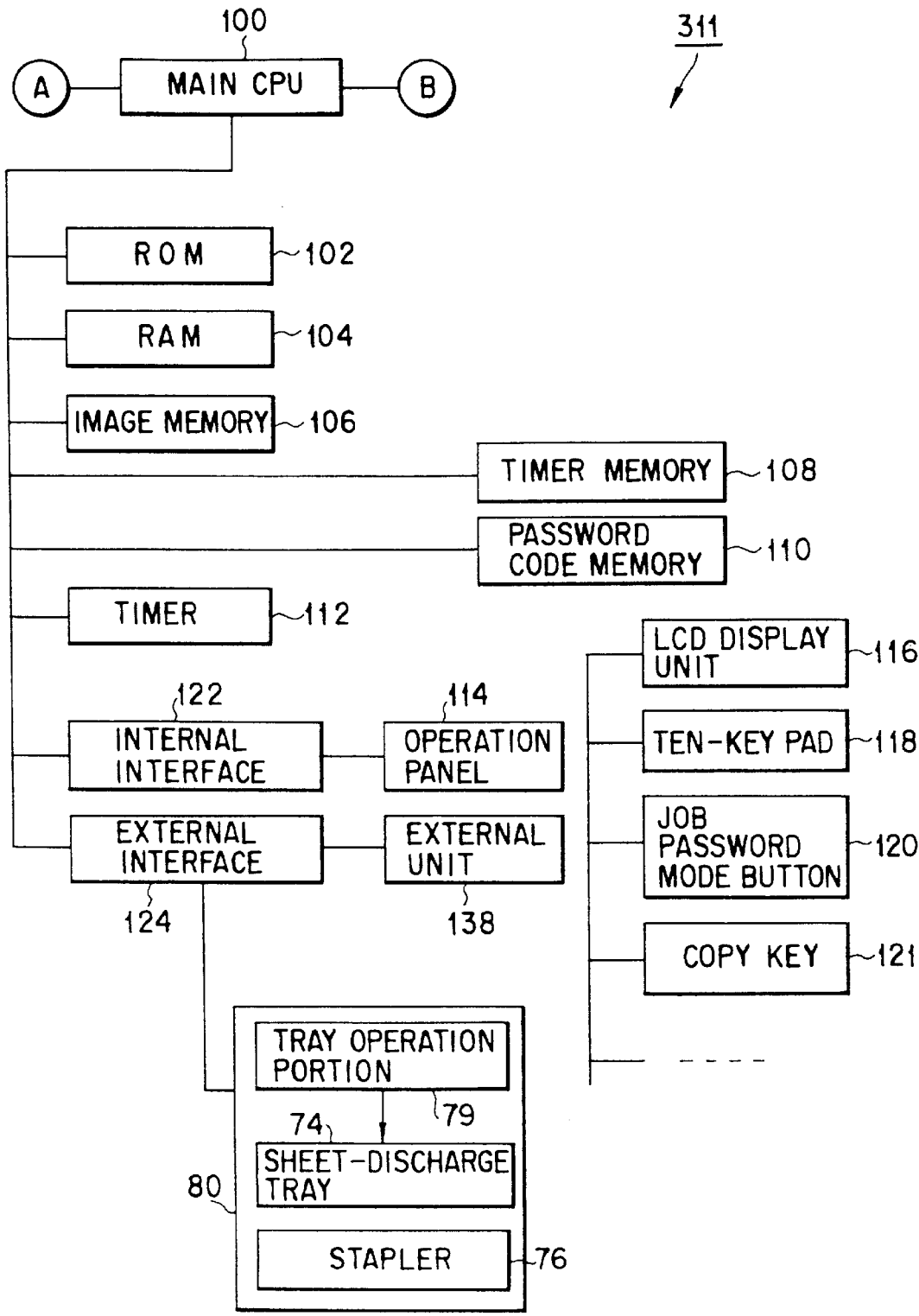
FIG. 3 is a block diagram showing the structure of a basic control portion.
Figure 4:
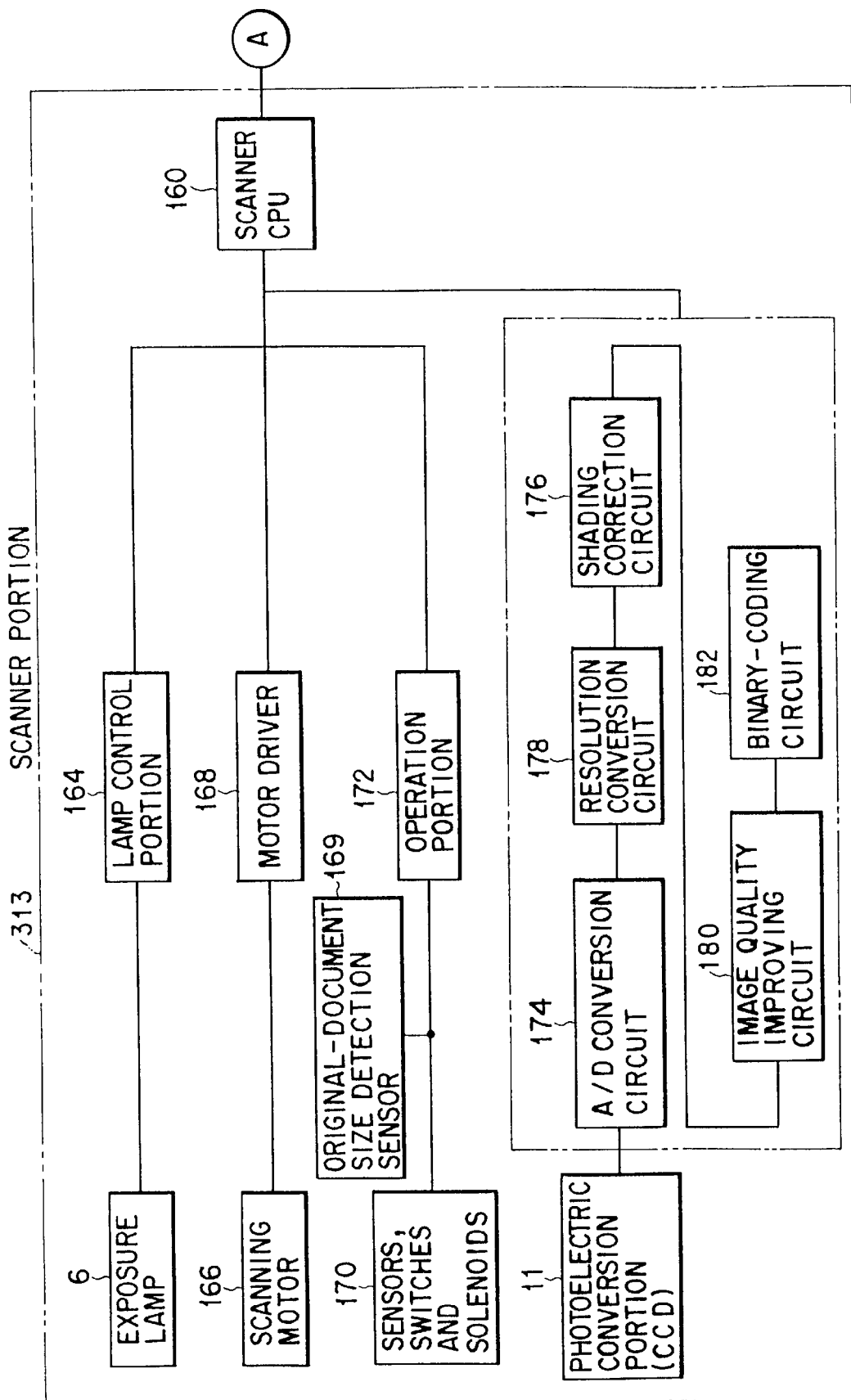
FIG. 4 is a block diagram showing the structure of a scanner portion.
Figure 5:
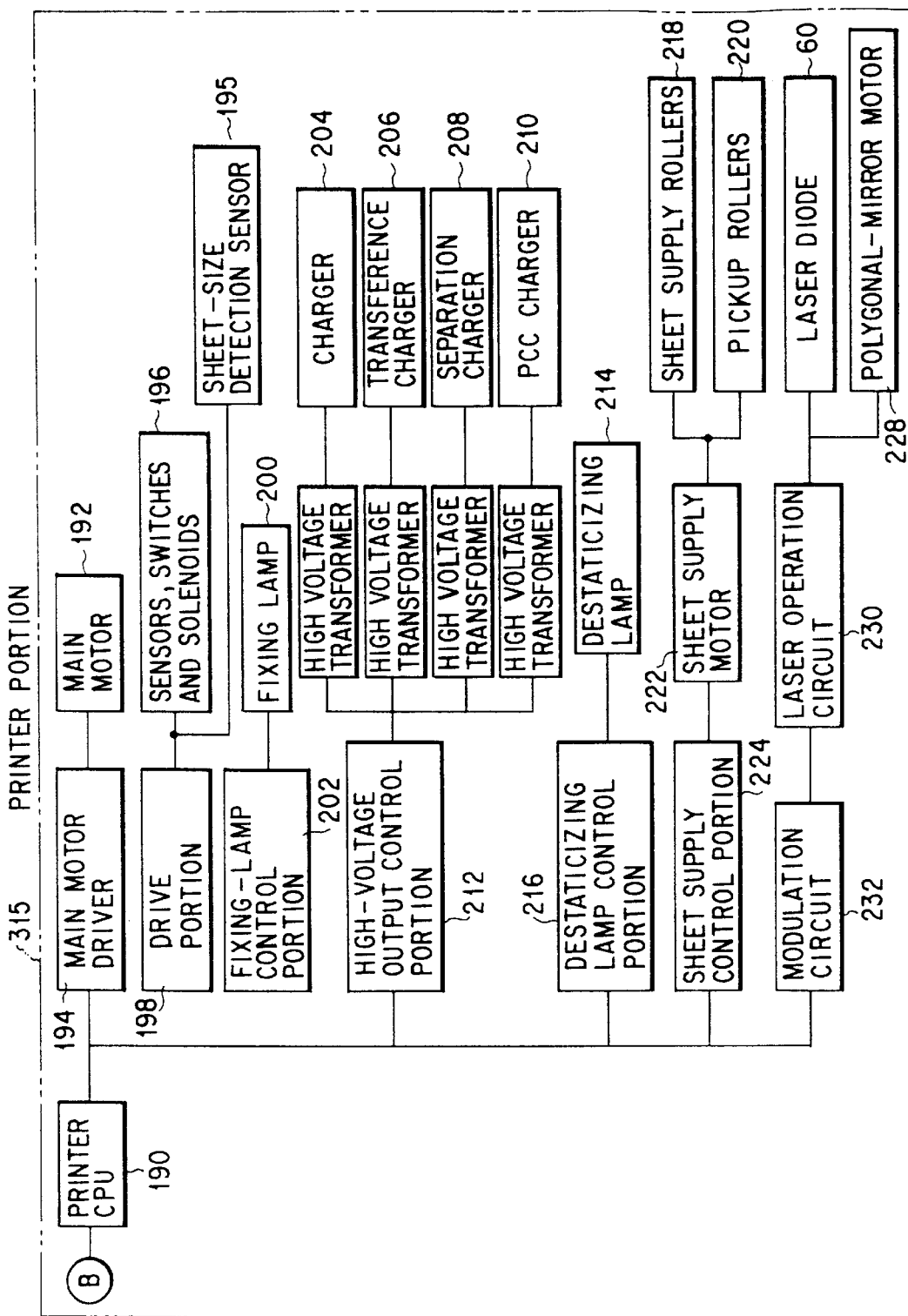
FIG. 5 is a block diagram showing the structure of a printer portion.

Referring to FIGS. 2 to 5, a control circuit for the image forming apparatus will now be described. FIG. 2 is a schematic block diagram of the image forming apparatus such as a digital copying machine control system according to the embodiment of the present invention. FIG. 3 shows a CPU portion, FIG. 4 shows a scanner portion and FIG. 5 shows a printer portion.

As shown in FIG. 2, the digital copying machine control system is composed of two blocks consisting of a basic portion 301 and a page memory portion 302. In the basic portion 301, an image processing portion 314 is connected between a scanner 313 and a printer 315 so that the digital copying machine is formed. The page memory portion 302 realizes memory copy by receiving and storing image data from the basic portion 301 and by again transferring the stored image data items to the basic portion 301.

The basic portion 301 and the page memory portion 302 are connected to each other by a basic-portion system interface 316 for communicating control data and a basic-portion image interface 317 for communicating image data.

The basic portion 301 consists of the scanner 313, the printer 315, the image processing portion 314 and a basic control portion 311 for controlling the foregoing units.

As shown in FIG. 3, a ROM 102, a RAM 104, an image memory 106, a timer memory 108, a password code memory 110, a timer 112, an internal interface 122 and an external interface 124 are connected to a main CPU 100 of the basic control portion 311. An operation panel 114 is connected to the internal interface 122. The operation panel 114 has an LCD display unit 116, a ten-key pad 118, a job password mode button 120, a copy key 121 and the like. The external interface 124 is connected to the sorter 80 and an external unit 138. A sheet-discharge tray 74 of the sorter 80 is driven by a tray drive portion 79.

In the structure formed as described above, image information is stored and read by the main CPU 100. In a case where a password code and image information are stored for example, image information read by the scanner portion under control of a scanner CPU 160 is stored in the image memory 106 to follow an instruction issued from the main CPU 100. The mode of the instruction from the main CPU 100 is determined in accordance with input (input using keys) from the operation portion.

Referring to FIG. 4, the detailed structure of the scanner portion 313 will now be described. The scanner CPU 160 of the scanner portion 313 is connected to a lamp control portion 164 for controlling an irradiation lamp 6, a motor driver 168 for controlling a scanning motor 166, an original-document size detection sensor 169 and an operation portion 172 for operating and controlling variable sensors, switches and solenoids 170 so as to control the connected elements. The scanner CPU 160 is also connected to an A/D conversion circuit 174 for processing image information supplied from the photoelectric conversion element 11, a resolution conversion circuit 178, a shading correction circuit 176, an image quality improving circuit 180 and a binary-coding circuit 182 so as to control the connected elements.

Referring to FIG. 5, the printer 315 will now be described in detail. In the printer 315, a printer CPU 190 is connected to a main motor driver 194 for rotating a main motor 192, a sheet-size detection sensor 195, an drive portion 198 for controlling sensors, switches and solenoids 196, a fixing-lamp control portion 202 for controlling a fixing lamp 200, a high-voltage output control portion 212 for controlling a charger 204, a transference charger 206, a separation charger 208 and a PCC charger 210, a destaticizing lamp control portion 216 for controlling a destaticizing lamp 214, a sheet supply control portion 224 for controlling a sheet supply motor 222 for rotating sheet supply rollers 218 and pickup rollers 220 and a modulation circuit 232 for controlling a laser operation circuit 230 for the electrooptic conversion portion (a laser diode) 60 and a polygonal-mirror motor 228.

The page memory portion 302 will now be described in detail with reference to FIG. 2. The structure of a bus line 310 connected to a system bus 318 of the basic portion 301 is converted into a bus line 329 by a bus conversion portion 330. A page memory 323 temporarily stores image data, while an address control portion 306 generates address for the page memory 323. An image bus 320 is a bus line for transferring data between devices in the page memory portion 302. A data control portion 307 controls data transference when data is transferred between the page memory 323 and the other device through the image bus 320.

An image data I/F 308 interfaces image data when image data is transferred to and from the basic portion 301 through the basic-portion image interface 317. A resolution conversion/binary rotation portion 325 converts the resolution of image data to the resolution of another unit when image data is transmitted to the unit having the different resolution, converts image data received from a unit having a different resolution to the resolution of the printer 315 of the basic portion 301 and rotates binary-coded image data by an angular degree of 90 degrees.

A compression/expansion portion 324 compresses supplied image data for the devices for performing facsimile transmission or optical disc storage which compresses and transmits image data and expands image data in the compressed form to be visualized through the printer 315. A multi-value rotation memory 309 is connected to the image data I/F means 308 and operated to rotate image data by an angular degree of 90 degrees or −90 degrees so as to transmit the rotated image data when the image data is transmitted to the printer 315.

Figure 6:
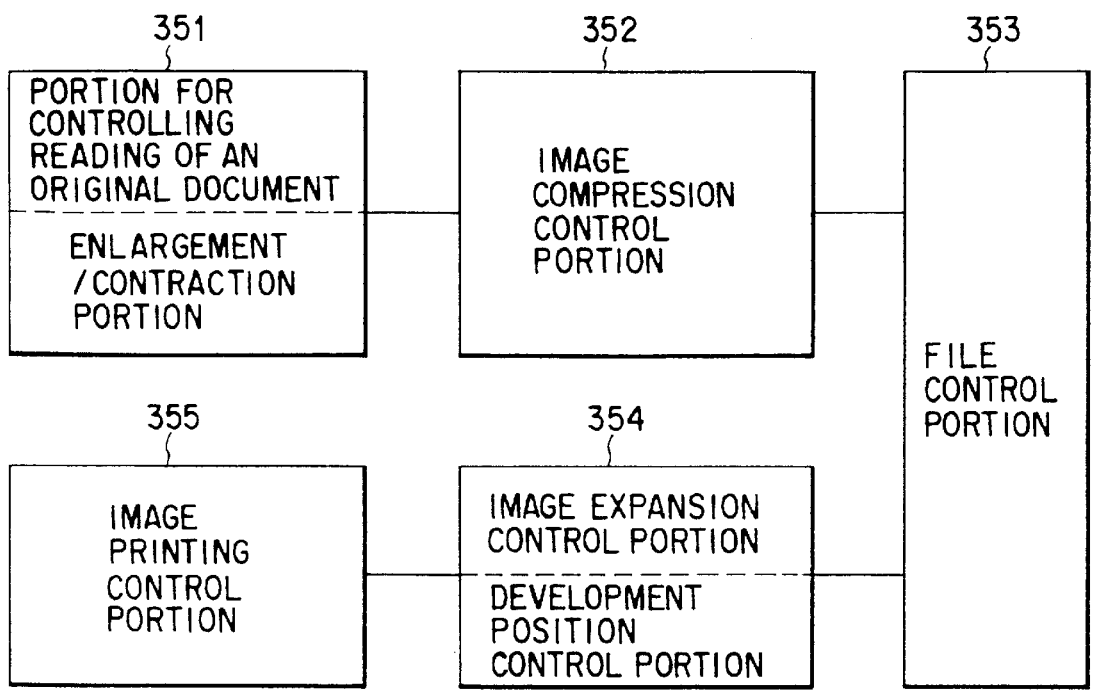
FIG. 6 is a diagram showing function control blocks for realizing electronic sorting in the image forming apparatus.

FIG. 6 is a functional block diagram showing an electronic sorting function of the image forming apparatus according to the present invention. Referring to the functional block diagram shown in FIG. 6, a portion for controlling reading an original document and enlargement/contraction portion 351 corresponds to, for example, the scanner 313 and the image processing portion 314, an image compression control portion 352 and an image expansion control portion/development position control portion 354 correspond to the compression/expansion portion 324, an image printing control portion 355 corresponds to the printer 315 and a file control portion 353 corresponds to the data control portion 307 and the like.

The portion for controlling reading an original document of the portion for controlling reading of an original document and enlargement/contraction portion 351 quantizes image data supplied from the scanner portion 313 to write the same on the page memory 323. If an original document has been set to the automatic original-document supply apparatus 200, the portion for controlling reading of an original document causes the original document to be supplied from the automatic original-document supply apparatus 200 and reads the original document correspondently. The original document set to the automatic original-document supply apparatus 200 is read such that the final page is read first. If a double side original document has been instructed, the original document is read in such a manner that the reverse side of the final page is read first, the right side of the same is read and then the right side of the leading pages read last.

The enlargement/contraction portion of the portion for controlling reading of an original document and enlargement/contraction portion 351 is a sub-module of the portion for controlling reading of an original document and arranged to determine the reduction or the enlargement ratio (hereinafter called as a "magnification") in accordance with the relationship between the sheet and the size of the original document, determines the number of longitudinal and horizontal pixels of an image to be copied and processes, that is, enlarges or reduces image data supplied from the scanner portion 313.

In the image compression control portion 352 and the file control portion 353, image data on the page memory 323 is compressed and, in a file form, written on a region to be controlled.

Figure 7:
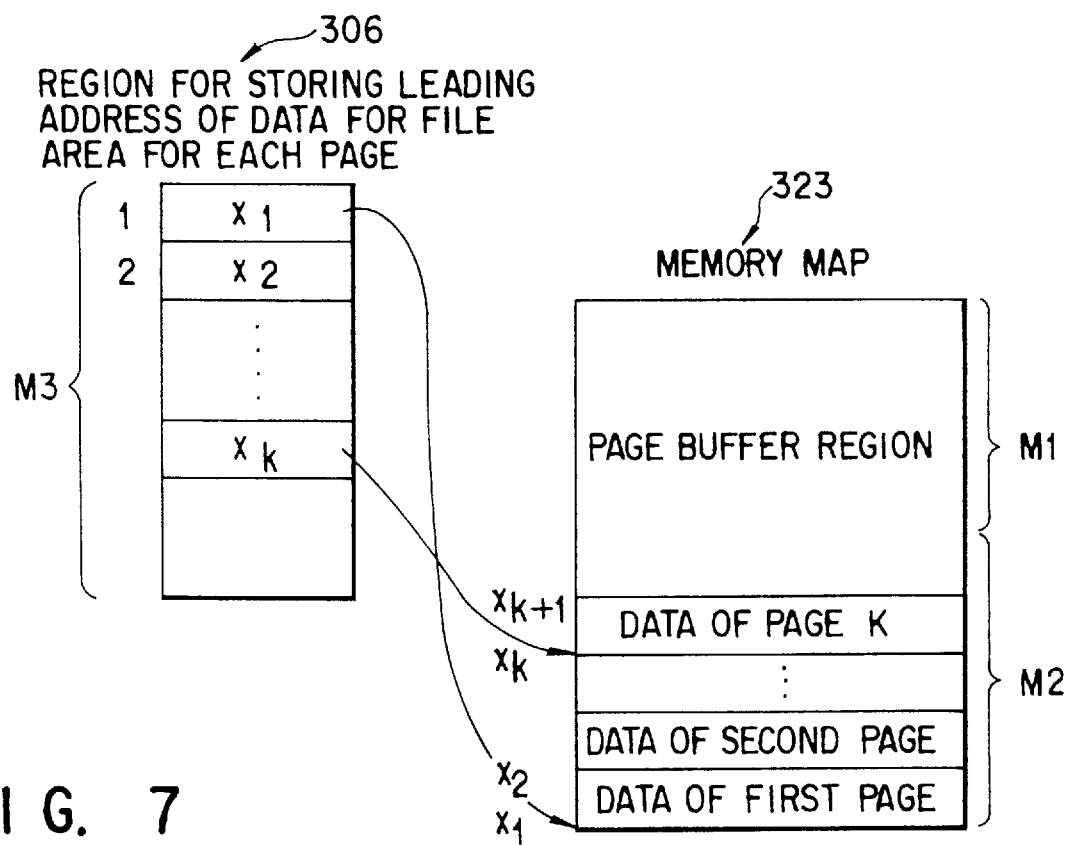
FIG. 7 is a diagram showing the structure of storage regions in the page memory.

FIG. 7 shows the structure of the storage region of the page memory 323 which is sectioned into page buffer region M1 on which image data of the original document read by the scanner portion 313 is written as it is and a file area M2 on which data formed by compressing the image data above is written and which is sectioned into regions for corresponding pages.

The leading address of each page of the file area M2 is stored in leading address storage region M3 for storing page data in each file area in the address control portion 306. Note that the file may be formed on a volatile memory, such as a RAM, or a large capacity non-volatile memory, such as a hard disk.

When an operator has set an original document to, for example, the automatic original-document supply apparatus 200 and depressed the copy key 121 to copy the original document, the portion for controlling reading of an original document and enlargement/contraction portion 351 causes the original document to be supplied and enlarges or contracts image data obtained by reading the supplied original document. The file control portion 353 writes the image data on the page memory 323. The image compression control portion 352 compresses written image data for each page and causes the same to be stored in the file area M2 sectioned into corresponding pages. The foregoing process is performed until all of the original document sheets set to the automatic original-document supply apparatus 200 are supplied. The memory full takes place during the process, the input operation is interrupted and all of image data items input, compressed and stored are deleted and the copying operation is interrupted.

After data of all of the original document sheets has been stored in the page memory 323, the control is performed by the image expansion control portion/development position control portion 354.

The image expansion control portion/development position control portion 354 sequentially reads, from the file area M2, the compressed images of the original document to expand the image in units of one side (the page to be output) to be output (printed), the image expansion control portion/development position control portion 354 then transferring the expanded image to the image printing control portion 355. The foregoing process is performed until all of the original document images are read.

The sequential order of the operations of reading the compressed image data items are determined to correspond to the original document page numbers to be described later. The images are printed in the determined order, and then the printed sheets are stacked on the tray 75b of the automatic double side unit 75.

In the automatic double side unit 75, the sheets having the printed reverse sides are stacked on the tray 75b, and then the sheets are extracted from the tray 75b so that the right sides are printed. Then, the sheets having the two sides on which images have been printed are discharged onto the sheet-discharge tray 74. In a case where the original document has a plurality of sheets, the reverse side of each sheet is initially printed, and then all of the printed sheets having the printed reverse sides are stacked. Then, the right sides of the sheets are printed while being discharged from the automatic double side unit 75. Thus, the sheets having the printed two sides are discharged onto the sheet-discharge tray 74.

FIGS. 8A to 8C show the printing operation to be performed by the automatic two-side unit 75. In a case where an original document, consisting of 8 sheets each having one side on which an image has been formed, is intermediately bound, fourth and fifth pages are, as shown in FIG. 8A, printed on the reverse side of a first sheet under control of the data control portion 307. Then, second and seventh pages are printed on the reverse side of a second sheet. Then, the printed sheets are stacked on the tray 75b of the automatic two-side unit 75. Then, as shown in FIG. 8B, the sheet having the reverse side having the second and seventh pages printed thereon is extracted from the tray 75b, followed by printing the first and eighth pages on the right side of the sheet and discharging the sheet. Then, the sheet having the reverse side having the fourth and fifth pages printed thereon is extracted, followed by printing the third and sixth pages and discharging the sheet. Thus, one copy which has been intermediately bound can be made. As described above, an original document each consisting of, for example, eight A4-size sheets each having an image on one side thereof is printed on two A4-size sheets having two sides on which images have been printed. If two or more copies are required, the foregoing operation is repeated by the number corresponding to the required number of copies.

If the number of sheets forming the original document is not a multiple of four, the images are shifted to the forward sheets by one page. An example of an output is shown in FIG. 8C which is a result of a printing operation in which an original document consisting of 6 sheets is intermediately bound and printed.

A magnification to be realized by an enlargement/reduction portion of the portion for controlling reading an original document and enlargement/reduction portion 351 is calculated by the main CPU 100 by using a program for determining the magnification stored in the ROM 102 and according to the present invention. FIG. 9 shows an example of a copying operation to be performed when an A4-size original document is copied to A5-size sheets without image rotation. In the foregoing case, the enlargement ratio or the reduction ratio is calculated in such a manner that the largest possible original document image is developed to cover the overall region of the sheet by lengthwise and crosswise enlarging or reducing the image. Assuming that the width of an A4-size sheet is expressed as A4W, the length of the A4-size sheet is expressed as A4H, the width of an A5-size sheet is expressed as A5W and the length of the A5-size sheet is expressed as A5H, the magnification is calculated by A5W/A4W or A5H/A4H. The magnification to be employed is either of A5W/A4W or A5H/A4H that has smaller value. In this case, the same value is obtained and a magnification of 71% is employed.

FIG. 10 shows an example of an intermediate binding copying operation as an intermediate binding, standard-size and connected format in which an A4-size original document is intermediately bound and printed to obtain A4R-size (horizontal direction) sheets. In the foregoing case, the enlargement ratio or the reduction ratio is calculated in such a manner that the largest possible original document image is developed to cover the half region of the sheet by lengthwise and crosswise enlarging or reducing the image. The magnification to be employed is either of A4H/2/A4W or A4W/A4H that has smaller value. Also in this case, the same value is obtained and a magnification of 71% is employed.

Figure 11:
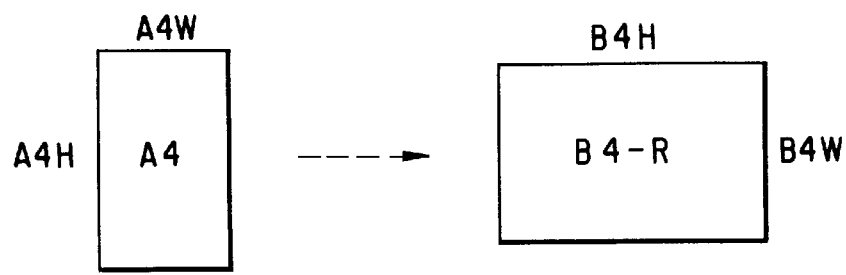
FIG. 11 is a diagram showing an example of an operation for copying an A4-size original document to B4-R (horizontal direction) sheets.

FIG. 11 shows an example of a copying operation in which image rotation is performed such that an A4-size original document is copied to B4-R (horizontal direction) sheets. In the foregoing case, the enlargement ratio or the reduction ratio is calculated in such a manner that the largest possible original document image is developed to cover the overall region of the sheet by lengthwise and crosswise enlarging or reducing the image. The magnification to be employed is either of B4W/A4W or B4H/A4H that has smaller value.

Figure 12:
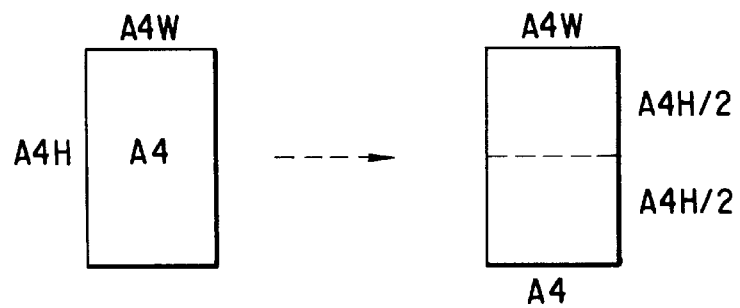
FIG. 12 is a diagram showing an example of an operation for copying an A4-size original document to A4-size sheets in the intermediate binding mode.

FIG. 12 shows an example of a copying operation as intermediate binding, standard-size and connected format in which the image is rotated and A4size original document is intermediately bound and copied to A4-size sheets. In the foregoing case, the largest possible original document image is developed to cover the half region of the sheet by rotating the image and by lengthwise and crosswise enlarging or reducing the image. The magnification to be employed is either of A4W/A4H or (A4H/2)/A4W that has smaller value.

The image forming apparatus according to the present invention is structured to maintain the specified binding margin in the copy paper and enlarge/reduce the image of the original document to correspond to the residual region in the sheet. That is, the provided binding margin does not inhibit complete printing of the image of the original document onto the paper. A required magnification to be employed when the binding margin has been specified is calculated by the main CPU 100 by using a program stored in the ROM 102.

A method of calculating a required magnification to be employed when a copying operation is performed in a state where a binding margin has been specified will now be described.

Figure 13:
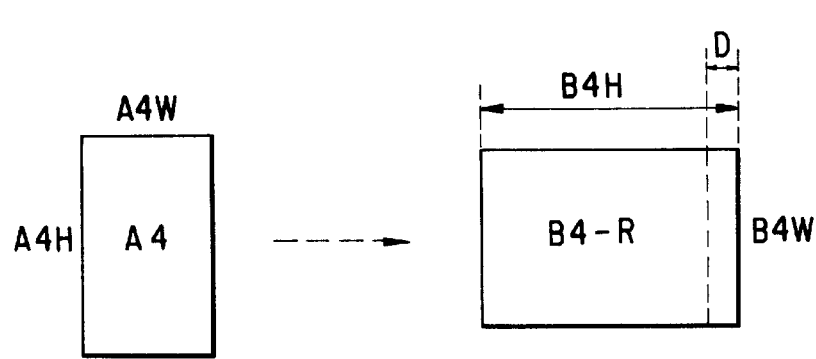
FIG. 13 is a diagram showing an example of a copying operation in which a specification to provide binding margin D for the short side of the sheets has been made.

FIG. 13 shows an example in which a specification has been made to provide binding margin D for the short side of the sheet when an A4-size original document is copied to B4-R (horizontal direction) sheets with image rotation. The magnification to be employed is either of B4W/A4W or (B4H–D)/A4H that has smaller value.

Figure 14:
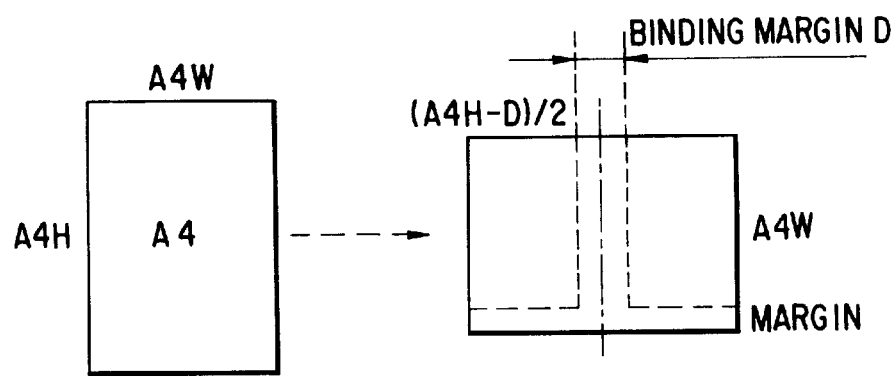
FIG. 14 is a diagram of an example of an operation in which intermediate binding has been specified.

FIG. 14 shows a case where the intermediate binding has been specified. In the case where intermediate binding has been specified, binding margin D is provided accurately in the center of the sheet. The image of the original document is reduced and read so as to be included in the region from which the binding margin has been omitted. That is, when the binding margin has been specified, the image of the original document is reduced to a size somewhat smaller than the size which is employed when no binding margin is specified. The magnification to be employed is either of ((A4H–D)/2)/A4W or A4W/A4H that has smaller value. Moreover, an adjusting magnification (for example, 98%) for providing a small margin for the peripheral portion of the printed image is multiplied to determine the magnification with which the original document is finally read. In the foregoing case, a margin is formed as illustrated.

Figure 15:
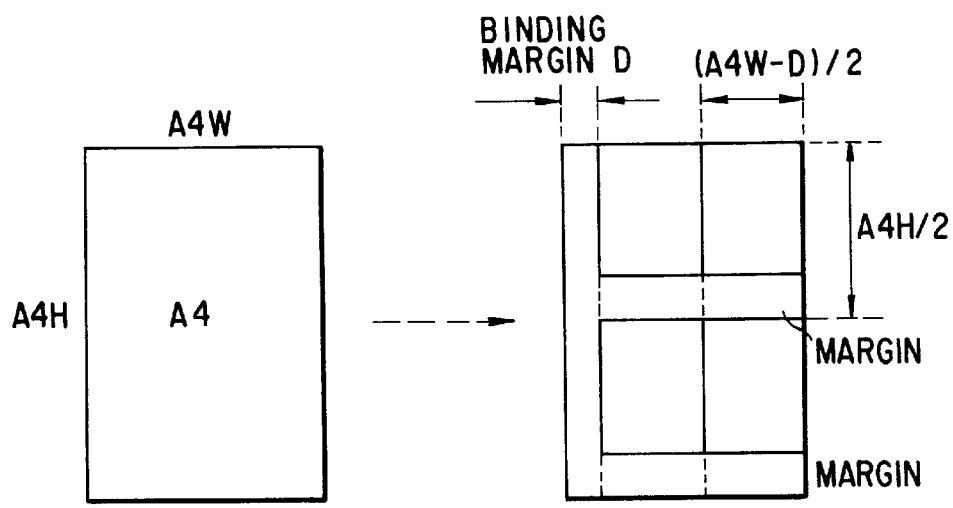
FIG. 15 is a diagram showing an example of an operation to be performed when a specification has been made to provide binding margin D for the short side.

FIG. 15 shows a case where an A4-size original document consisting of four sheets is printed on A4-size sheet in such a manner that the images are connected to one another and binding margin D is provided for the long side. The magnification to be employed is either of ((A4W–D)/2)/A4W or (A4H/2)/A4H that has smaller value. In this case, two margin lines are formed as illustrated.

As described with reference to FIGS. 13 to 15, if the image is reduced to provide the binding margin, a margin is formed. Therefore, the position of the image is shifted to uniformly provide the margins.

Figure 16:
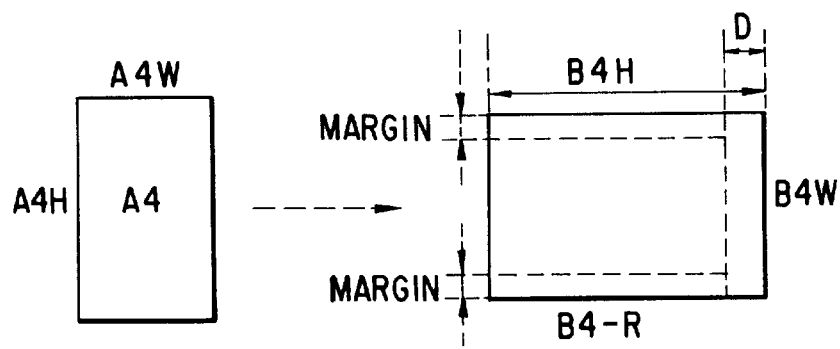
FIG. 16 is a diagram showing an example of an operation when an adjustment has been performed to uniformly form margins.
Figure 17:
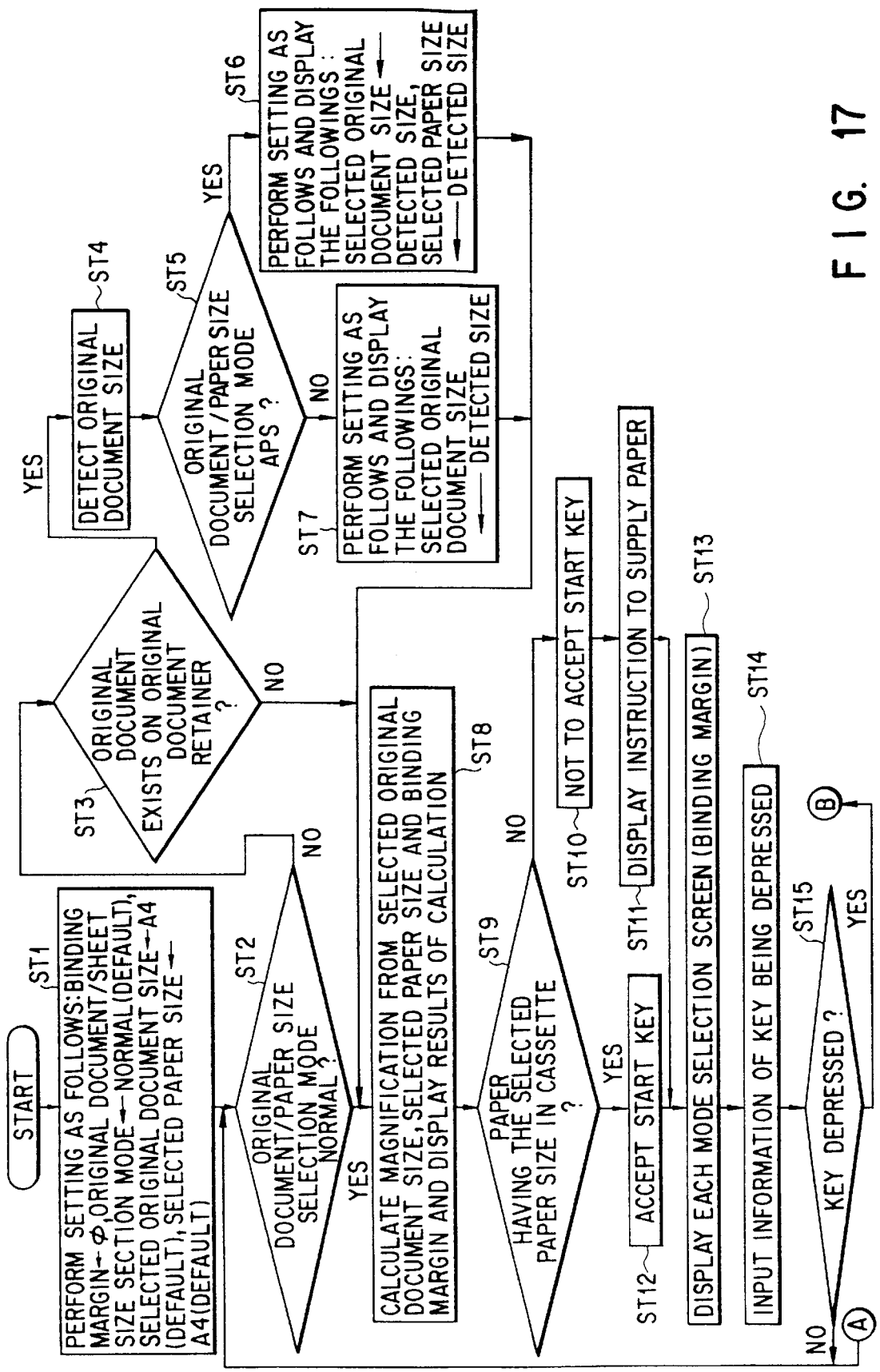
FIG. 17 is a flow chart of operations for reading an original document and storing and printing images of the original document.
Figure 19:
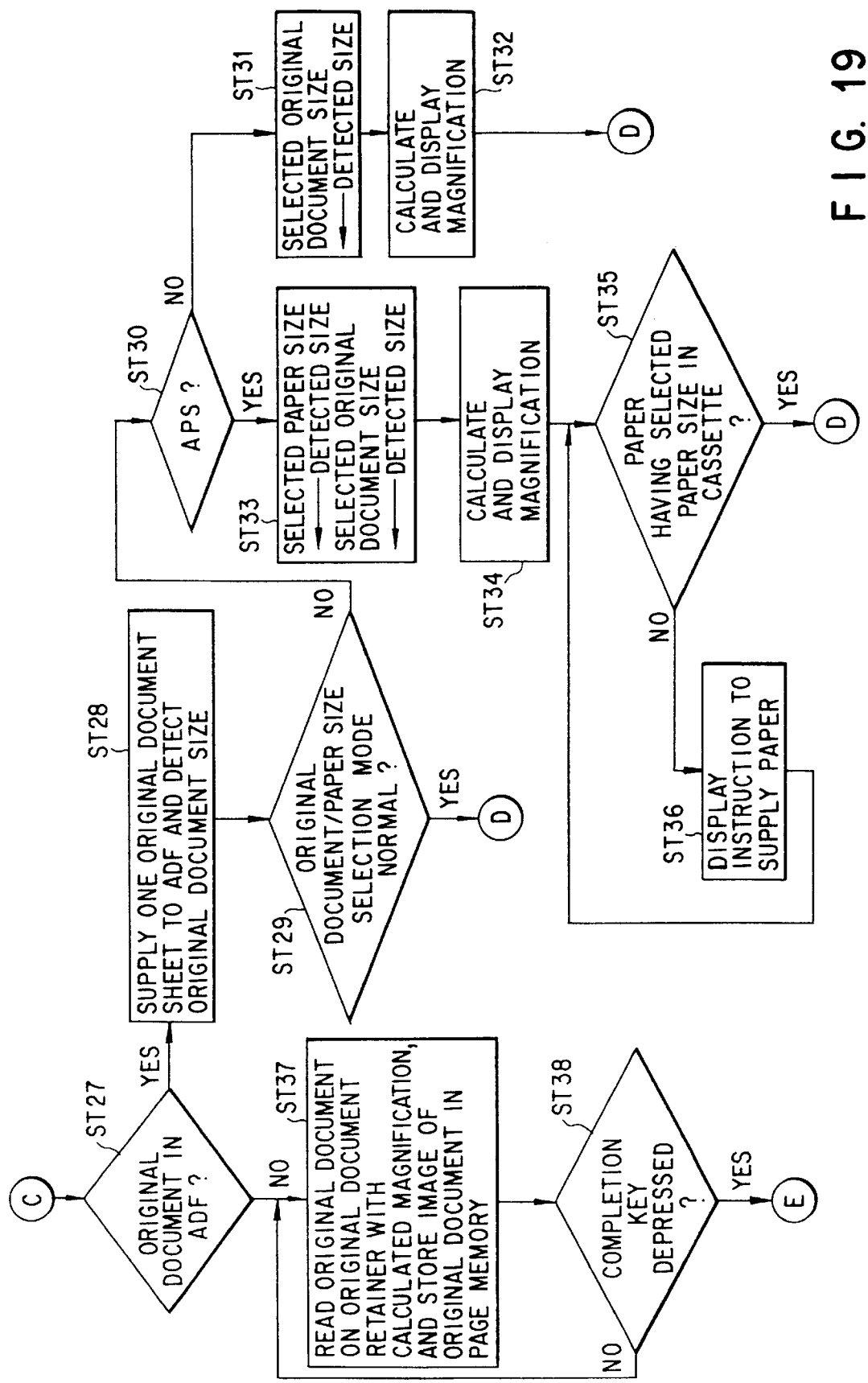
FIG. 19 is a flow chart of operations for reading an original document and storing and printing images of the original document.
Figure 20B:
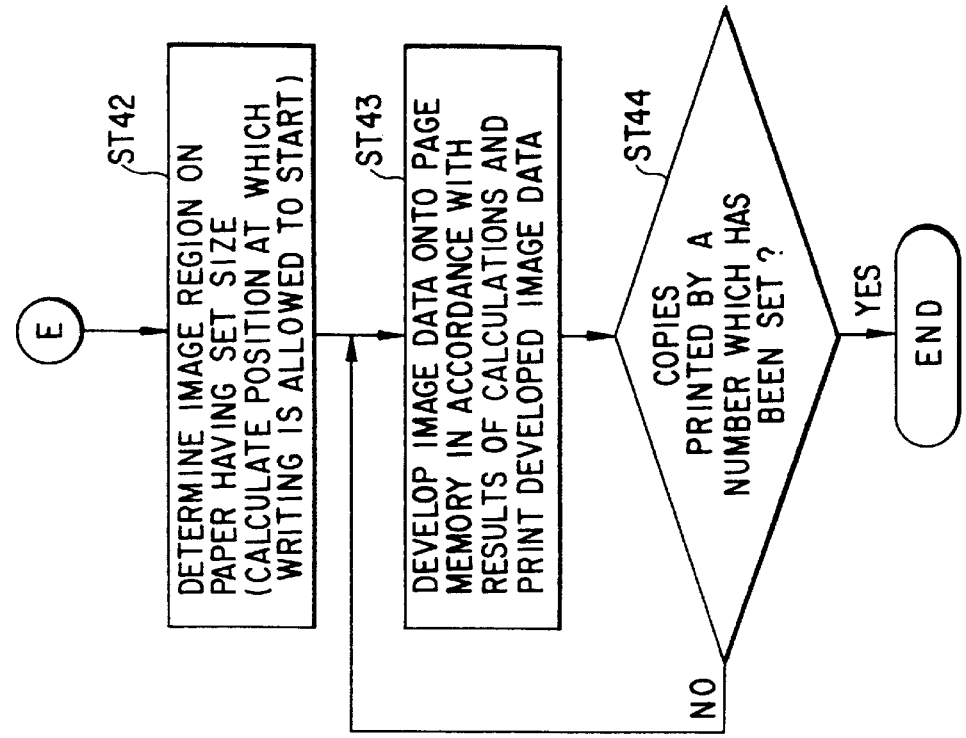
FIGS. 20A and 20B show a flow chart of operations for reading an original document and storing and printing images of the original document.
Figure 20A:
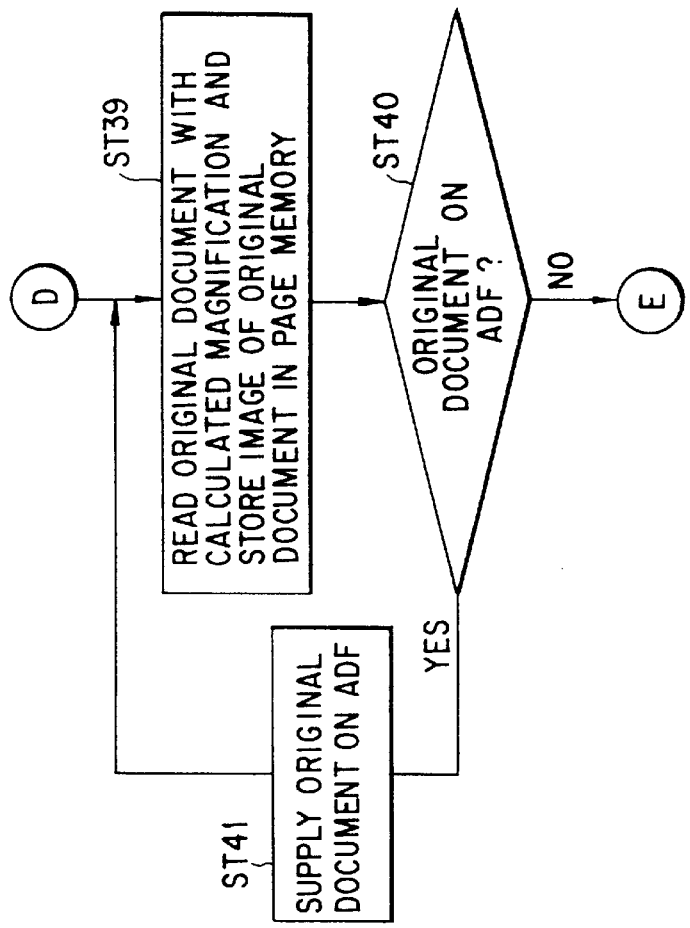

FIG. 16 shows a case where an A4-size original document is copied to B4-R (horizontal direction) sheets and margins are formed uniformly. The magnification to be employed is either of B4W/A4W or (B4H–D)/A4H that has smaller value. Moreover, the image, to be input with the employed magnification X is vertically shifted so as to be located in the central portion in the widthwise direction of the B4-size sheet. In the foregoing case, the amount of shift is (B4W–A4W×X)/2.

The operations for reading the original document, storing images of the original document and printing the same to be performed in the foregoing structure will now be described with reference to a flow chart shown in FIGS. 17 to 20.

When a menu has been selected by an operator who has operated an operation panel 114, the main CPU 100 causes an LCD display unit 116 to display a mode selection screen. With the mode selection screen, the binding margin, original document/sheet size selection mode and the like are set (ST1). Note that the default is determined such that the original document/sheet size selection mode is "normal", the selected original document size is A4 size and the selected sheet size is A4 size.

If the original document/sheet size selection mode is not "normal" (ST2) and in a case where an original document exists on the original-document retainer 2 (ST3), then the size of the original document is detected by an original document detection sensor 169 (ST4). If the original document/sheet size selection mode is APS (Auto Paper Select) (ST5), the original document size is detected and sheets having the same size as that of the original document are selected (ST6). If the binding margin has not been set, a magnification of 100% is selected. If the original document/sheet size selection mode is AMS (Auto Magnification Select) (in a case of "No" in step ST5), the size of the original document is detected and the size set in step ST1 is employed (ST7). The magnification is, in step ST8, calculated from the selected original document size and the selected sheet size, and the calculated magnification is displayed on the LCD display unit 116. If a binding margin has been set, a magnification is determined in such a manner that the printed image is not lacked as described with reference to FIGS. 13 to 15.

The main CPU 100 confirms whether the sheet having the selected size exists in a sheet supply cassette 30 (ST9). If the sheet does not exist, the main CPU 100 performs setting in such a manner that the instruction by using the start key (the copy key) 121 is not accepted (ST10). Then, an instruction to supply sheets is displayed on the LCD display unit 116 (ST11). If sheets having the selected size exist in the sheet supply cassette 30, the main CPU 100 performs setting in such a manner that the instruction using the start key (the copy key) 121 is accepted (ST12).

Then, the main CPU 100 causes the LCD display unit 116 to display the mode selection screen (the binding margin and so forth) (ST13) to receive information about respective depressed keys (ST14). If keys have been depressed (ST15), the main CPU 100 determines information corresponding to the depressed keys as follows:

If the key depressed in step ST16 is the start key (the copy key) 121, the flow is shifted to step ST27. If the key is not the start key (the copy key) 121, the flow is shifted to step ST17. If it is determined that the original-document size selection key, such as "B5" or "A3", displayed on the LCD display unit 116 has been depressed in step ST17, the original document/sheet size selection mode is set to be normal. If an APS lamp or an AMS lamp is turned on, the lamp is turned off (ST18). Then, the size of the original document selected in step ST17 is set as the selected original document size, followed by returning the flow to step ST2 (ST19). If it is determined that the sheet size selection key, such as "B5" or "A3" displayed on the LCD display unit 116 has been depressed in step 20, the original document/sheet size selection mode is set to be normal. If the APS lamp or the AMS lamp is turned on, the lamp is turned off (ST21). Then, the sheet size selected in step ST20 is set as the selected sheet size, followed by returning the flow to step ST2 (ST22). If it is determined that the APS key displayed on the LCD display unit 116 has been depressed in step ST23, the original document/sheet size selection mode is set to APS, followed by turning the APS lamp on. Then, the flow returns to step ST2 (ST24). If it is determined that the AMS key displayed on the LCD display unit 116 has been displayed in step ST25, the original document/sheet size selection mode is set to AMS, followed by turning the AMS lamp on. Then, the flow returns to step ST2 (ST26).

In step ST27 the main CPU 100 checks whether an original document exists on the automatic original-document supply unit 200 in accordance with a detection signal supplied from the original-document detection sensor 29. If an original document exists, one of the original document sheets on the automatic original-document supply unit 200 is supplied, followed by checking the size of the original document by the original document detection sensor 169 (ST28). If the original document/sheet size selection mode is normal in step ST29, the flow is shifted to step ST39.

If the original document/sheet size selection mode is not normal in step ST29 and if the APS is not selected in step ST30, the selected original document size is set to the size detected in step ST28 (ST31). Moreover, the magnification is calculated and the obtained magnification is displayed on the LCD display unit 116 (ST32). Then, the flow is shifted to step ST39. If the APS has been selected in step ST30, the selected paper size and the selected original document size are set to be the detected sizes (ST33). Moreover, the magnification is calculated and the obtained magnification is displayed on the LCD display unit 116 (ST34). If the sheets having the selected sheet size exist in the sheet supply cassette 30 in step ST35, the flow is shifted to step ST39. If the sheet having the selected sheet size does not exist in the sheet supply cassette 30, an instruction to supply sheets is displayed on the LCD display unit 116 (ST36).

In step ST27 the main CPU 100 checks whether an original document exists on the automatic original-document supply unit 200 in accordance with a detection signal supplied from the original-document detection sensor 29. If no original document exists, the original document on the original-document retainer 2 is read with the magnification calculated in step ST8. Then, the read image of the original document is compressed for each page so as to be stored in the page memory 323 of the page memory portion 302 as compressed data (ST37). When a completion key on the LCD display unit 116 is depressed, the flow is shifted to step ST42.

In step ST39 the main CPU 100 reads the original document with the calculated magnification, followed by compressing the read image of the original document for each page so as to be stored in the page memory 323 of the page memory portion 302 as compressed data (ST39). The operation for reading the original document is continued until all of the original document sheets on the automatic original-document supply unit 200 are processed (ST40 and ST41). After all of the original document sheets have been processed, the flow is shifted to step ST42.

In step ST42 the main CPU 100 determines an image region (calculates a position at which writing is allowed to start) on a sheet having the determined size. If a binding margin has been set, the image region is determined in such a manner that the binding margin is provided as shown in FIGS. 13 to 15 and, if necessary, margins are formed uniformly, as shown in FIG. 16. In accordance with a result of the determination above, the main CPU 100 develops compressed image data stored in the page memory 323, the development being performed in the page memory portion 302. Then, the main CPU 100 causes the printer 315 to print image data under control of the image processing portion 314 (ST43). After a predetermined number of copies has been printed, the main CPU 100 completes the process (ST44).

As described, the image of the original document is read, stored and printed. An operation will now be described in detail in which intermediate binding is set and an A4-size original document (longitudinal) consisting of, for example, 8 sheets, is printed to A4R-size (horizontal direction) sheets.

When an operator has selected and depressed the intermediate binding mode on the selection screen displayed on the LCD display unit 116, the main CPU 100 causes the LCD display unit 116 to display a requirement for the operator to set the amount of binding (for example, 10 mm), the sheet size (A4-R) and the required number of copies (for example, three copies). Thus, the operator sets the required factors.

The main CPU 100 causes the scanner 313 to read the original document, and causes read image data to be temporarily stored in the buffer region M1 of the page memory 323, followed by compressing the image data item. Then, the main CPU 100 stores the compressed data in the file region M2 for each page.

After all images of the original document have been read, the main CPU 100 calculates the reduction ratio (the magnification) in such a manner that the image region on the sheet corresponding to the set amount of the binding margin can be provided and the size of the original document sheet is considered. Then, the main CPU 100 determines a position (from which the margins are formed uniformly) at which writing of image data is allowed to start.

In accordance with a result of the calculation, the main CPU 100 causes the printer 315 to, as shown in FIGS. 8A and 8B, perform the printing operation such that the fourth and fifth pages are printed on the reverse side of the first sheet, followed by stacking the first sheet on the tray 75b of the automatic two-side unit 75. Then, the second and seventh pages are printed on the reverse side of the second sheet, and then stacked on the tray 75b. Then, the sheet having the images of the second and seventh pages printed on the reverse side thereof is extracted from the tray 75b, followed by printing the first and eighth pages on the right side of the sheet, followed by discharging the sheet to the sheet discharge tray 74. Then, the sheet having the fourth and fifth pages printed on the reverse side thereof is extracted, followed by printing the third and sixth pages on the right side of the sheet, followed by discharging the sheet to the sheet discharge tray 74. Thus, one copy which has been intermediately bound is made. Since three copies have been required, the foregoing operation is further performed two times, and then the operation is completed.

As described above, according to the embodiments of the present invention, the image of an original document can be printed out without lacking of the image of the original document when a binding margin has been set because the image of the original document is reduced (or enlarged) to an extent corresponding to the amount of the set binding margin.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image forming apparatus, comprising:
   means for setting image forming conditions including an amount of a margin which is formed in an end region of an image forming medium when an image is, on the image forming medium, formed from image information;
   means for inputting information of the size of an original document and the size of the image forming medium;
   means for reading the image information of the original document;
   means for rotating the image information according to a direction of the image information read by the reading means and image forming mediums;
   means for, in accordance with the image information read by said reading means, forming the images on the image forming mediums having the size input by said input means;
   means for calculating a magnification with which the image information read by said reading means is formed in a region of the image forming medium except the set margin portion in accordance with the amount of margins, the size information of the image forming medium the size information of the original document and a rotation result of the rotating means, when the amount of margins have been set by the setting means; and
   means for converting the image information read by said reading means in accordance with a result of calculation performed by said calculating means to cause said image forming means to form the images on the image forming medium.

2. An apparatus according to claim 1, wherein
   said converting means has means for changing magnification of the image information read by said reading means with the magnification calculated by said calculating means and causing said image forming means to form the images from image information, the magnification of which has been changed.

3. An apparatus according to claim 2, wherein
   said converting means has means for determining a position at which the images are written in the region except the margin portions in such a manner that the margins are formed uniformly when the magnification of image information read by said reading means has been changed with the magnification calculated by said calculating means.

4. An apparatus according to claim 1, wherein
   said setting means has means for setting an intermediate binding mode, and
   said converting means has means for controlling said image forming means in such a manner that the images are formed on the image forming mediums by the intermediate binding method when the intermediate binding mode has been set by setting means.

5. Apparatus according to claim 1, wherein
   said setting means has means for setting memory edition and copying mode in which a plurality of original document images are formed on one image forming medium, and said converting means has means for controlling said image forming means in such a manner that the plural original document images are formed on one image forming medium when the memory edition and copying mode has been set by said setting means.

6. An image forming apparatus, comprising:

means for setting image forming conditions including sizes of a sheet and an original document and a width of a binding margin to be employed when an image is formed on a sheet from image information;

a scanner for reading the image information of the original document;

storage means for storing the image information read by said scanner after rotating the image information according to directions of the sheet and the original document;

a printer for forming the images on the sheets having the size set by said setting means in accordance with the image information stored in said storage means;

means for calculating magnification of the image information stored in said storage means in accordance with a sheet region, which is a result of subtraction of the width of the binding margin from the sheet size set by said setting means, and the rotated image information, when the width of the binding margin has been set by said setting means as the image forming condition;

means for determining a position at which the images are printed with which margins can be uniformly formed in the sheet region after scaling the image information stored in said storage means with the magnification calculated by said calculating means; and means for controlling said printer to form the images in accordance with the position at which the images are written and which has been determined by said determining means and the magnification calculated by said calculating means.

7. An apparatus according to claim 6, wherein said calculating means has means for calculating the magnification in such a manner that a first magnification which can be obtained by dividing the short side of the residual sheet region by the short side of the original document and a second magnification which can be obtained by dividing the long side of the residual sheet region by the long side of the original document are calculated and providing a smaller magnification.

8. An apparatus according to claim 6, wherein said setting means has means for setting an intermediate binding mode, and said control means has second control means for controlling said image forming means in such a manner that the images are formed on the image forming mediums by the intermediate binding method when the intermediate binding mode has been set by said setting means.

9. An apparatus according to claim 6, wherein said setting means has means for setting a memory edition and copying mode in which a plurality of original document images are formed on one image forming medium, and said control means has second control means for controlling said image forming means in such a manner that the plural original document images are formed on one image forming medium when the memory edition and copying mode has been set by said setting means.

10. An image forming method comprising the steps of:

setting image forming conditions including sizes of a sheet and an original document and a binding margin when an image is formed;

reading image information of the original document and storing read image information after rotating the read image information according to directions of the sheets and the original document;

calculating magnification of stored image information in accordance with a sheet region, which is a result of subtraction of the width of the binding margin determined in the setting step from the sheet size, and the rotated image information;

determining a position at which the image is written and with which the margin which is formed when the stored image information is processed in accordance with the calculated magnification is uniformly formed in the sheet region; and forming the images based on the determined position at which the images are written and the image information is processed in accordance with the calculated magnification.

* * * * *